US008059527B2

(12) United States Patent  (10) Patent No.: US 8,059,527 B2
Townsley et al.  (45) Date of Patent: Nov. 15, 2011

(54) TECHNIQUES FOR OVERSUBSCRIBING EDGE NODES FOR VIRTUAL PRIVATE NETWORKS

(75) Inventors: William Mark Townsley, Nashville, TN (US); Earl Hardin Booth, III, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 687 days.

(21) Appl. No.: 11/281,269

(22) Filed: Nov. 16, 2005

(65) Prior Publication Data

US 2006/0187937 A1   Aug. 24, 2006

Related U.S. Application Data

(63) Continuation-in-part of application No. 11/145,752, filed on Jun. 6, 2005, now Pat. No. 7,769,037.

(60) Provisional application No. 60/654,661, filed on Feb. 19, 2005.

(51) Int. Cl.
 *H04L 12/26* (2006.01)
(52) U.S. Cl. ......... 370/225; 370/242; 370/410; 709/220
(58) Field of Classification Search ............. None
 See application file for complete search history.

(56) References Cited

U.S. PATENT DOCUMENTS

| 5,959,972 | A | * | 9/1999 | Hamami | 370/228 |
| 6,028,862 | A | * | 2/2000 | Russell et al. | 370/397 |
| 6,125,119 | A | * | 9/2000 | Cherukuri et al. | 370/410 |
| 6,381,246 | B1 | * | 4/2002 | Constantinof et al. | 370/410 |
| 6,549,533 | B1 | | 4/2003 | Campbell | |
| 6,829,215 | B2 | * | 12/2004 | Tornar | 370/223 |
| 7,042,988 | B2 | | 5/2006 | Juitt et al. | |
| 7,082,101 | B2 | * | 7/2006 | Kim et al. | 370/225 |
| 7,085,579 | B2 | | 8/2006 | Mizutani et al. | |
| 7,124,189 | B2 | | 10/2006 | Summers et al. | |

(Continued)

FOREIGN PATENT DOCUMENTS

CN  101218575 A  11/2005

(Continued)

OTHER PUBLICATIONS

J. Heinanen et al., "Using Radius for PE-Basd VPN Discovery," Draft-IETF-L2VPN-Radius-PE-Discovery-00.TXT, Feb. 1, 2004, Publisher: IETF.ORG, Published in: Internet.

(Continued)

*Primary Examiner* — Brian Roberts
(74) *Attorney, Agent, or Firm* — Patent Capital Group

(57) ABSTRACT

Techniques for operating a network interface include automatically determining whether communications are terminated over a particular attachment circuit on a network interface on an intermediate network node at an edge of a provider network, whereby a sign of death (SOD) on the particular attachment circuit is indicated. The attachment circuit is switched with a particular virtual private network that is a link layer virtual private network (VPN) encapsulated in a higher layer protocol. The provider network is a packet-switched network. The network interface is for a direct communication link to a customer network node outside the provider network. If it is determined that there is an indication of the SOD, then a new network action is initiated in response to the SOD on the particular attachment circuit. These techniques allow for automatic logging of usage, billing, and fault detection, as well as for over-subscription of network resources for multiple VPNs.

11 Claims, 6 Drawing Sheets

U.S. PATENT DOCUMENTS

| | | | |
|---|---|---|---|
| 7,149,224 | B1 | 12/2006 | Krishnamurthy |
| 7,197,550 | B2 | 3/2007 | Cheline et al. |
| 7,340,519 | B1 | 3/2008 | Golan et al. |
| 7,373,661 | B2 | 5/2008 | Smith et al. |
| 7,389,534 | B1 | 6/2008 | He |
| 7,420,933 | B2 | 9/2008 | Booth, III et al. |
| 7,421,736 | B2 | 9/2008 | Mukherjee et al. |
| 7,469,282 | B2 * | 12/2008 | Taylor et al. ............ 709/223 |
| 7,469,298 | B2 | 12/2008 | Kitada et al. |
| 7,483,996 | B2 | 1/2009 | Townsley et al. |
| 7,489,693 | B2 | 2/2009 | Xu |
| 7,535,856 | B2 | 5/2009 | Booth, III et al. |
| 7,590,148 | B2 | 9/2009 | Wu |
| 7,610,396 | B2 | 10/2009 | Taglienti et al. |
| 7,623,504 | B2 | 11/2009 | Phu |
| 7,936,710 | B2 | 5/2011 | Rodriguez et al. |
| 2001/0026553 | A1* | 10/2001 | Gallant et al. ............ 370/395 |
| 2003/0026248 | A1 | 2/2003 | Hiroki |
| 2003/0041170 | A1 | 2/2003 | Suzuki |
| 2003/0055987 | A1 | 3/2003 | Ji et al. |
| 2003/0110268 | A1 | 6/2003 | Kermarec et al. |
| 2003/0110276 | A1 | 6/2003 | Riddle |
| 2003/0217126 | A1 | 11/2003 | Polcha et al. |
| 2004/0006708 | A1 | 1/2004 | Mukherjee et al. |
| 2004/0044789 | A1 | 3/2004 | Angel et al. |
| 2004/0052263 | A1 | 3/2004 | Xu |
| 2004/0078621 | A1* | 4/2004 | Talaugon et al. ............ 714/4 |
| 2004/0156313 | A1 | 8/2004 | Hofmeister et al. |
| 2004/0167978 | A1 | 8/2004 | Kitayama |
| 2005/0021770 | A1 | 1/2005 | Helm et al. |
| 2005/0058132 | A1 | 3/2005 | Okano et al. |
| 2005/0097203 | A1* | 5/2005 | Unbehagen et al. ......... 709/223 |
| 2005/0114490 | A1 | 5/2005 | Redlich et al. |
| 2005/0135238 | A1* | 6/2005 | Taylor et al. ............ 370/228 |
| 2005/0135269 | A1 | 6/2005 | Saint-Hilaire et al. |
| 2005/0193103 | A1 | 9/2005 | Drabik |
| 2005/0213513 | A1 | 9/2005 | Ngo et al. |
| 2006/0018252 | A1* | 1/2006 | Sridhar et al. ............ 370/216 |
| 2006/0018300 | A1 | 1/2006 | Westberg et al. |
| 2006/0056384 | A1 | 3/2006 | Ishii et al. |
| 2006/0182037 | A1 | 8/2006 | Chen et al. |
| 2006/0187855 | A1 | 8/2006 | Booth, III et al. |
| 2006/0187856 | A1 | 8/2006 | Booth et al. |
| 2007/0121833 | A1 | 5/2007 | Xiong et al. |
| 2009/0154466 | A1 | 6/2009 | Townsley et al. |

FOREIGN PATENT DOCUMENTS

| | | |
|---|---|---|
| EP | 0917318 A2 | 5/1999 |
| EP | 1844402 A2 | 10/2007 |
| WO | WO 99-52244 A1 | 10/1999 |
| WO | WO 2006-057849 A2 | 6/2006 |

OTHER PUBLICATIONS

PCT, "Notification of Transmittal of the International Search Report and the Written Opinion of the International Searching Authority, or the Declaration," for PCT Application No. PCT/US2006/05817, dated Jun. 26, 2006, 8 pages.

J. Heinanen et al., "Using Radius for PE-Based VPN Discovery," draft-ietf-L2VPN-radius-pe-discovery-02.txt; Publisher: IETF.org (Internet), Oct. 2005; 17 pages.

E. Rosen et al., "Provisioning, Autodiscovery, and Signaling in L2VPNs," draft-ietf-L2VPN-signaling-08.txt; Publisher: IETF.org (Internet), May 2006; 37 pages.

L. Martini et al., "Encapsulation Methods for Transport of Ethernet Over MPLS Networks"; www.rfc-editor.org/rfc/rfc4448.txt; Apr. 2006; 23 pages.

G. Gross, et al., PPP Over AAL5, Jul. 1, 1998, Publisher: ietf.org, Published in: Internet, 13 pages.

L. Mamakos et al., A Method for Transmitting PPP Over Ethernet (PPPoE), Feb. 1, 1999, Publisher: ietf. org, Published in: Internet, 17 pages.

European Search Report for Application No. PCT/US2005/041225, dated Aug. 5, 2009, 9 pages.

Indian Patent Application Serial No. 1983/DELNP/2007 filed Nov. 15, 2005, entitled "Techniques for Migrating a Point to Point Protocol to a Protocol for an Access Network," Applicant: Cisco Technology, Inc.; 53 pages.

Indian Patent Application Serial No. 4777/DELNP/2007 filed Feb. 17, 2006, entitled"Techniques for for Oversubscribing Nodes for Virtual Private Networks," Applicant: Cisco Technology, Inc.; 80 pages.

PCT, "International Preliminary Report on Patentability and Written Opinion of the International Searching Authority," for Application No. PCT/US2005/041225, dated Oct. 16, 2007, 8 pages.

EP, Official Action, Supplementary European Search Report and Annex to European Search Report dated Jul. 27, 2009 (9 pages).

Chinese, The First Office Action, Filing No. 2005800310543, dated Jul. 10, 2009; 13 pages.

Chinese, The First Office Action, Filing No. 2006800017167, dated Oct. 9, 2009; 12 pages.

U.S. Appl. No. 12/555,777, filed Sep. 8, 2009, entitled "System and Method for Providing Dynamic Provisioning in a Network Environment," Inventor(s): Wojciech Dec, et al.

USPTO Jun. 14, 2011 Non-Final Rejection for U.S. Appl. No. 12/335,841.

PRC May 6, 2011 SIPO Second Office Action from Chinese Application No. 200680001716.7; 8 pages.

PRC May 6, 2011 SIPO Second Office Action from Chinese Application No. 200580031054.3; 11 pages.

* cited by examiner

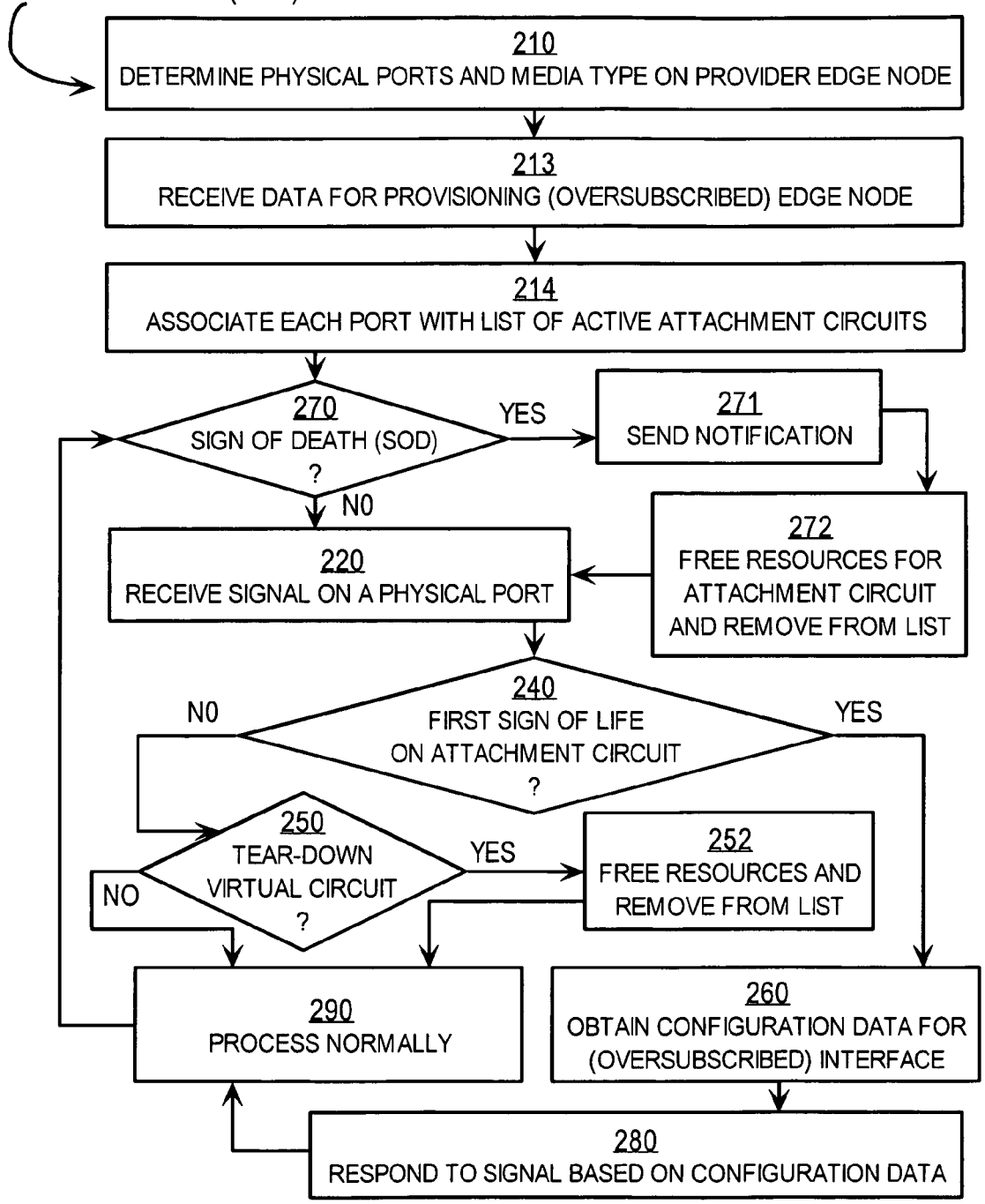

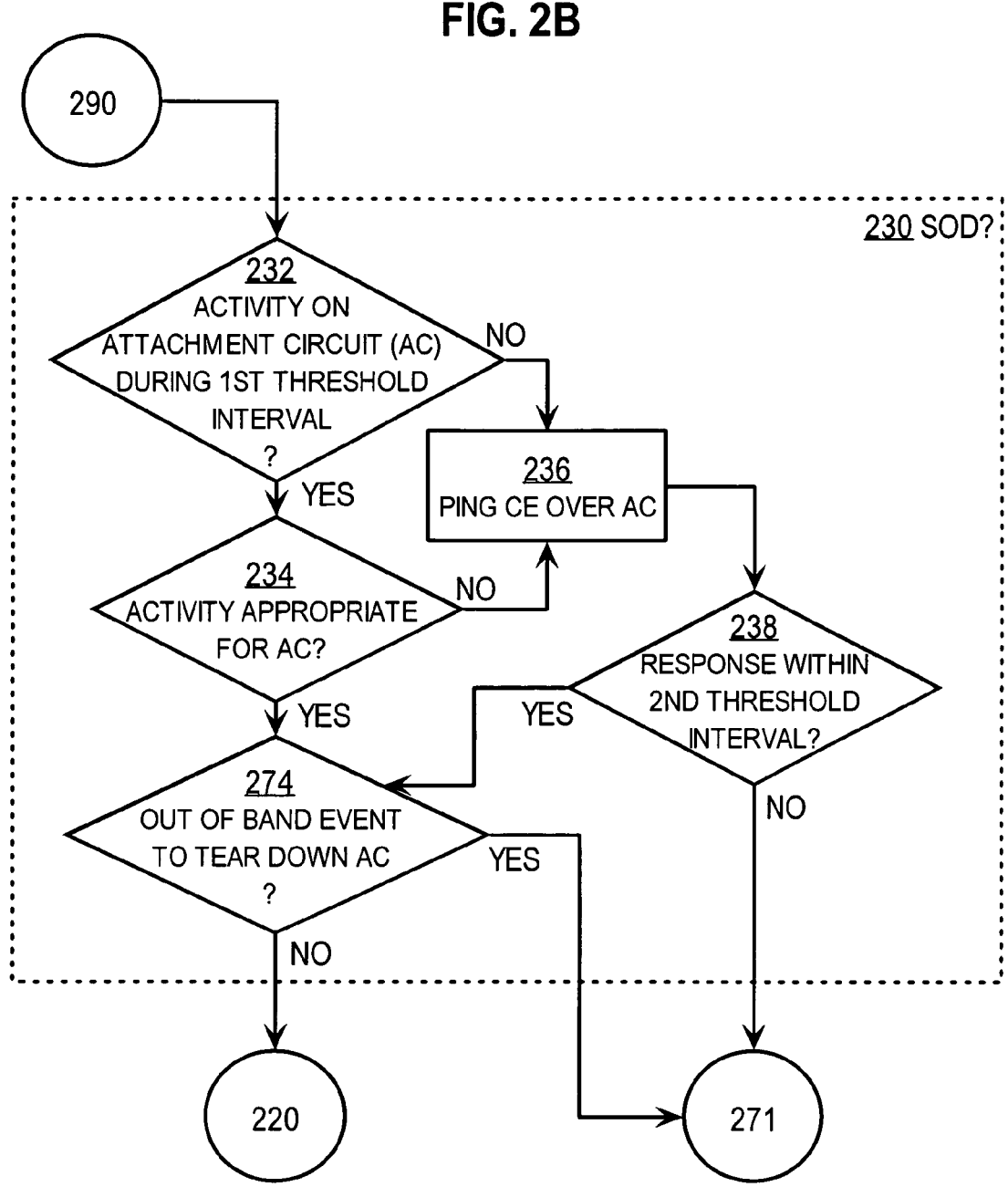

FIG. 3A

300 CUSTOMER EQUIPMENT (CE) ATTACHMENT CIRCUIT (AC) RECORD

| 302 ROUTER ID | 304 AC ID | 306 VC ID | 308 AC SERVICE |

FIG. 3B

320 VPN RECORD FOR PARTICULAR PROVIDER EDGE NODE (PE)

| 302 ROUTER ID | 306 VC ID | 324 OTHER PE LIST |

FIG. 3C

340 PSEUDO WIRE (PW) RECORD

| 302 ROUTER ID | 344 OTHER PE ID | 348 PW PROPERTIES |

TECHNIQUES FOR OVERSUBSCRIBING EDGE NODES FOR VIRTUAL PRIVATE NETWORKS

CROSS-REFERENCE TO RELATED APPLICATIONS

This application claims benefit of Provisional Appln. 60/654,661, filed Feb. 19, 2005 (hereinafter Townsley), the entire contents of which are hereby incorporated by reference as if fully set forth herein, under 35 U.S.C. §119(e).

This application claims benefit of application Ser. No. 11/142,768, filed Jun. 1, 2005, and issued on May 19, 2009 as U.S. Pat. No. 7,535,856, the entire contents of which are hereby incorporated by reference as if fully set forth herein, under 35 U.S.C. §120.

This application claims benefit as a Continuation-in-part of application. Ser. No. 11/145,752, filed Jun. 6, 2005 (hereinafter Booth), the entire contents of which are hereby incorporated by reference as if fully set forth herein, under 35 U.S.C. §120.

BACKGROUND OF THE INVENTION

1. Field of the Invention

The present invention relates to using one or more virtual private networks (VPNs) based on layer 2 protocols on a packet switching infrastructure that belongs to a trusted service provider; and in particular to configuring each customer interface to a provider edge network node for over-subscribed VPN operation involving more network resources than can be supported at the same time.

2. Description of the Related Art

Networks of general purpose computer systems and other devices connected by external communication links are well known and widely used in commerce. The networks often include one or more network devices that facilitate the passage of information between the computer systems and other devices. A network node is a network device or computer system or other device connected by the communication links.

Information is exchanged between network nodes according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The layer 2 tunneling protocol (L2TP) is a link layer (layer 2) protocol established to provide a persistent virtual circuit as a tunnel between two end nodes of a trusted sub-network. In network parlance, a tunnel for data is simply a protocol that encapsulates that data. The persistent tunnel, or virtual circuit on a packet switched network is often called a pseudo-wire. L2TP facilitates the tunneling of point to point protocol (PPP) packets across an intervening network in a way that is as transparent as possible to both end-users and applications. Using L2TP tunneling, an Internet Service Provider (ISP), or other access service provider, can create a pseudo wire to link a customer's remote sites or remote users with corporate home networks. More recent versions of L2TP facilitate tunneling of a number of data link types, including, but not limited to, Point to Point Protocol (PPP), Frame Relay (FR), Asynchronous Transfer Mode (ATM), High Level Data Link Control (HDLC) and Ethernet. L2TP is described at the time of this writing in Internet Engineering Task Force (IETF) request for comments (RFC) 2661 which can be found in a file named rfc2661.txt, which can be found, along with other RFC files, at the World Wide Web domain www.ietf.org in the file directory named rfc. The entire contents of RFC 2661 are hereby incorporated by reference as if fully set forth herein. L2TPv3 is described in RFC 3817 available in file rfc3817.txt in the same directory. The entire contents of RFC 3817 are hereby incorporated by reference as if fully set forth herein.

Some protocols follow a layer 2 protocol and precede a layer 3 protocol; and are said to be layer 2.5 protocols. For example, the multi-protocol layer switching (MPLS) is a layer 2.5 protocol that provides for the designation, routing, forwarding and switching of traffic flows through a network and supports the transfer of multiple data link (layer 2) types. MPLS is described at the time of this writing in IETF RFC 3031 and RFC 3032 which can be found in files named rfc3031.txt and rfc3031.tx, the entire contents of which are hereby incorporated by reference as if fully set forth herein.

A virtual private network (VPN) is a technology to logically separate the data packets traveling over the same physical network, so that a user of one VPN does not see the data communicated between users of a different VPN. Access service providers frequently offer to customers VPNs that are implemented as one or more pseudo wires on a packet switched network (PSN) infrastructure, such as a network of routers using the Internet Protocol (IP) as a layer 3 protocol or using MPLS as a layer 2.5 protocol. A common approach for providing the tunneling functions for a VPN is to use the layer 2 tunneling of L2TPv3 as a payload in IP data packets. In some approaches, a protocol for Any Transport over MPLS (AToM) available from CISCO SYSTEMS™, Inc. of San Jose Calif. is used to support layer 2 tunneling in a payload in MPLS data packets. Then layer 2 protocols, such as PPP, FR, ATM, HDLC, Ethernet are used in these tunnels to transmit customer data or control plane information over the VPN.

A customer contracts with a service provider, such as an ISP, to provide a VPN among customer sites and to support certain kinds and amounts of data traffic over that VPN. In response, the service provider configures interfaces to customer equipment on several intermediate network nodes at the edge of the service provider network (so-called "provider edge nodes," PE, or simply "edge nodes"). Each interface is configured to communicate the type of traffic designated for that interface and encapsulate it in one or more tunnels, each tunnel directed to one of one or more other interfaces on other edge nodes of the service provider network. In the parlance of this technology, configuring each affected interface on each affected edge node provisions the VPN.

A PE interface to customer equipment (CE) is called an attachment circuit (AC) or port. Each physical interface can support one or more logical attachment circuits. For example, a single physical interface for ATM traffic can support multiple ATM virtual circuits, which may be directed to different VPNs; each ATM virtual circuit is considered a different attachment circuit to be configured. Configuration data specifies values for one or more parameters for each attachment circuit (AC). The parameters and values depend on the layer 2 protocol to be supported in the VPN, the topology of the VPN, and the tunneling protocol used to establish the pseudo wires. Example configuration data for a logical ATM AC specifies a percentage of total bandwidth devoted to the logical AC, a cell-packing value, the other PE devices in the topology, and a control plane protocol to establish and maintain pseudo wires among the connected PE.

Currently, provisioning the VPN is a manual process, in which a network administrator determines which data packets on each interface are sent out on which link to the provider network using which designations to be recognized by a subsequent intermediate nodes and edge node as a separate tunnel. The manual provisioning process is tedious and error prone. Furthermore, when a new piece of customer equipment is connected to an edge node, that equipment is unable to communicate over the VPN unless and until the human administrator provisions the VPN to add the new interface. Thus the process is subject to delays. The delays grow in severity as the human administrator becomes busier. The tedium and propensity for error increase with the complexity of the VPN topology (e.g., as the numbers of interfaces and edge nodes increase).

In some cases, for example when a customer has many remote sites or several customers share the same attachment circuit, the number of logical ACs to be carried from CE to PE exceeds the number that can be simultaneously supported by the physical media. For example the maximum data rate (e.g., expressed in bytes per second) for each of several ACs exceeds the bandwidth capacity of the physical link. In such circumstances, prior approaches have introduced a second physical link to carry the excess traffic that can not be carried by the first link.

There are several disadvantages with this approach. For example, if the excess is small, a relatively high capacity link and interface that are devoted to the excess traffic are underutilized. This is wasteful of valuable network resources and expensive for the service provider. Furthermore, it is often the case that all ACs between one pair of CE and PE are not used simultaneously. For example, traffic between offices on the same side of the world peak at local time business hours and may be unused for multiple hours at night. Conversely, traffic with a remote site may be concentrated during two time periods when one office is closing and the other is opening. Thus ACs devoted to this enterprise are not all used at the same time, and network resources devoted to such traffic is underutilized. In such circumstances it is desirable to over-subscribe the link between a CE and PE, i.e., to allow a customer or set of customers to subscribe for more ACs than can be simultaneously carried by one or more physical links.

In one approach, certain ACs are provisioned for certain times of day. A problem with this approach is that traffic is not completely predictable. Thus it is desirable to provision the ACs on demand. A problem with provisioning ACs on demand with current provisioning techniques is that those techniques are manual, slow and error-prone and are not likely to reliably and timely respond to AC configuration and VPN provisioning demands.

Based on the foregoing description, there is a clear need for techniques to provision on demand more VPNs on a provider's network edge node than can be carried simultaneously by one link between the customer equipment and provider edge without the deficiencies of prior art approaches. In particular, there is a clear need for techniques to provision on demand automatically, i.e., without human intervention, more ACs on one link than that link can simultaneously support.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram that illustrates at a high level a method for using a sign of death (SOD) on a customer attachment circuit at an edge node of a provider network, according to an embodiment;

FIG. 2B is a flow diagram that illustrates steps of the method of FIG. 2A for detecting a sign of death in more detail, according to an embodiment;

FIG. 3A is a block diagram that illustrates a customer interface record of configuration data, according to an embodiment;

FIG. 3B is a block diagram that illustrates a VPN record of configuration data, according to an embodiment;

FIG. 3C is a block diagram that illustrates a pseudo wire record of configuration data, according to an embodiment.

DETAILED DESCRIPTION

A method and apparatus are described for using a sign of death (SOD) on an attachment circuit, including using a SOD to over-subscribe attachment circuits on network interfaces of edge nodes for virtual private networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Certain embodiments of the invention are described in the context of a single server on a host of a provider network away from the provider edge, which provisions a single, layer-two virtual private network (VPN) on an Internet Protocol (IP) infrastructure for a single customer; but the invention is not limited to this context. In other embodiments, fewer or more servers on hosts at or away from the provider edge provision one or more layer-two VPNs for one or more customers using one or more protocols on a packet switching network based on one or more protocols above layer 2, such as IP and multi-protocol layer switching (MPLS) protocol. In some embodiments, the provider edge nodes are already configured to provision the VPN and do not perform further provisioning; but, instead, respond to a SOD on an attachment circuit for other purposes, such as fault detection and billing.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

1.0 Example Virtual Private Network

Figure 1A:
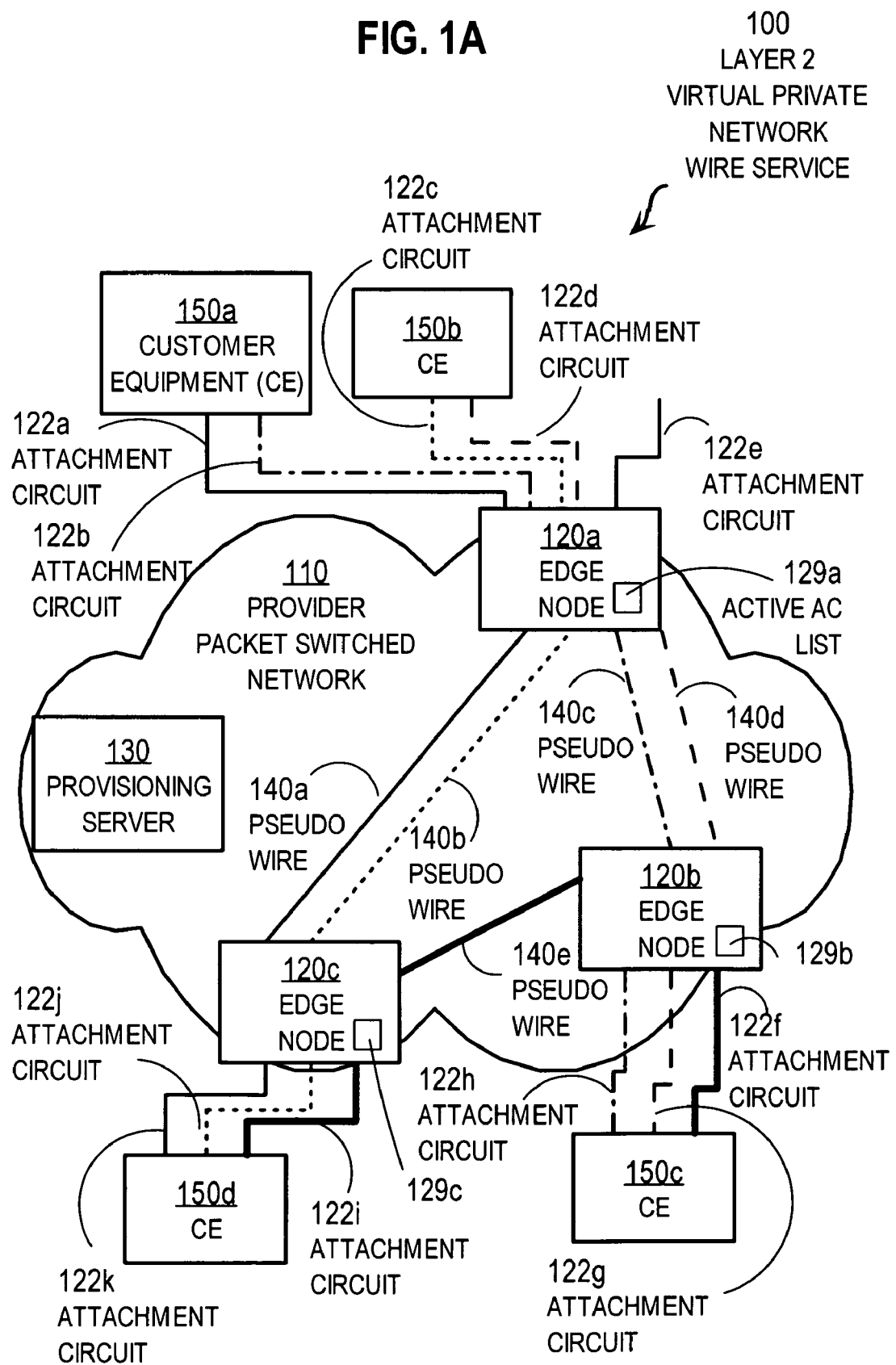
FIG. 1A is a block diagram that illustrates a virtual private network on a provider packet-switched network for a virtual private wire service, according to an embodiment.

FIG. 1A is a block diagram that illustrates a virtual private network 100 based on a virtual private wire service (VPWS) on a provider packet-switched network (PSN) 110, according to an embodiment. The provider PSN 110 includes two or more edge nodes, e.g., PE 120a, 120b, 120c (collectively referenced hereinafter as PE 120). Each PE 120 includes one or more physical interfaces to which customer premises equipment (CE) may be connected. The physical interfaces support one or more physical or logical attachment circuits (ACs) used by the customer to communicate over network 110. For example, PE 120a includes ACs 122a, 122b, 122c, 122d, 122e. CE 150a is connected to PE 120a through ACs 122a, 122b; and CE 150b is connected to PE 120a through ACs 122c, 122d. AC 122e is available for connecting to CE, but no CE is currently connected. Similarly, CE 150c is connected to PE 120b through ACs 122f, 122g, 122h. CE 150d is connected to PE 120c through ACs 122i, 122j, 122k. The CEs 150a, 150b, 150c, 150d are collectively referenced hereinafter as CEs 150. The ACs 122a, 122b, 122c, 122d, 122e, 122f, 122g, 122h, 122i, 122j, 122k are collectively referenced hereinafter as ACs 122. Also shown is provisioning server 130 on PSN 110.

VPN 100 includes multiple persistent tunnels between pairs of PEs. Each such tunnel is called a virtual circuit or pseudo wire (PW). FIG. 1A depicts five PWs, 140a, 140b, 140c, 140d, 140e (collectively referenced hereinafter as PWs 140) used to provide VPWS for point to point traffic among CEs 150. Point-to-point data packet traffic between CE 150a and CE 150d is carried by AC 122a and PW 140a and AC 122k. Point-to-point data packet traffic between CE 150b and CE 150d is carried by AC 122c and PW 140b and AC 122j. Similarly, point-to-point data packet traffic between CE 150a and CE 150c is carried by AC 122b and PW 140c and AC 122h; and such data packet traffic between CE 150b and CE 150c is carried by AC 122d and PW 140d and AC 122g. Point-to-point data packet traffic between CE 150c and CE 150d is carried by AC 122f and PW 140e and AC 122i. In some embodiments, one or more ACs 122 are logical ACs that share the same physical wire; e.g., ACs 122a, 122b are logical ACs that share the same physical transmission medium from edge node 120a to CE 150a. For example, FR, ATM and Ethernet virtual local area networks (VLANs) are attachment circuits which allow multiple customers (or services) to be transported on the same physical wire.

This complete collection of PWs in FIG. 1A is called a full mesh. In some circumstances, such a full mesh involves more PWs and associated costs than are needed. For example, if customer needs are satisfied so long as CE 150d has a PW to CE 150b and CE 150c has a PW to CE 150a, then only two PWs are needed, e.g., 140a and 140c, with fewer associated attachment circuits including only 122j, 122c and 122h, 122b.

Figure 1B:
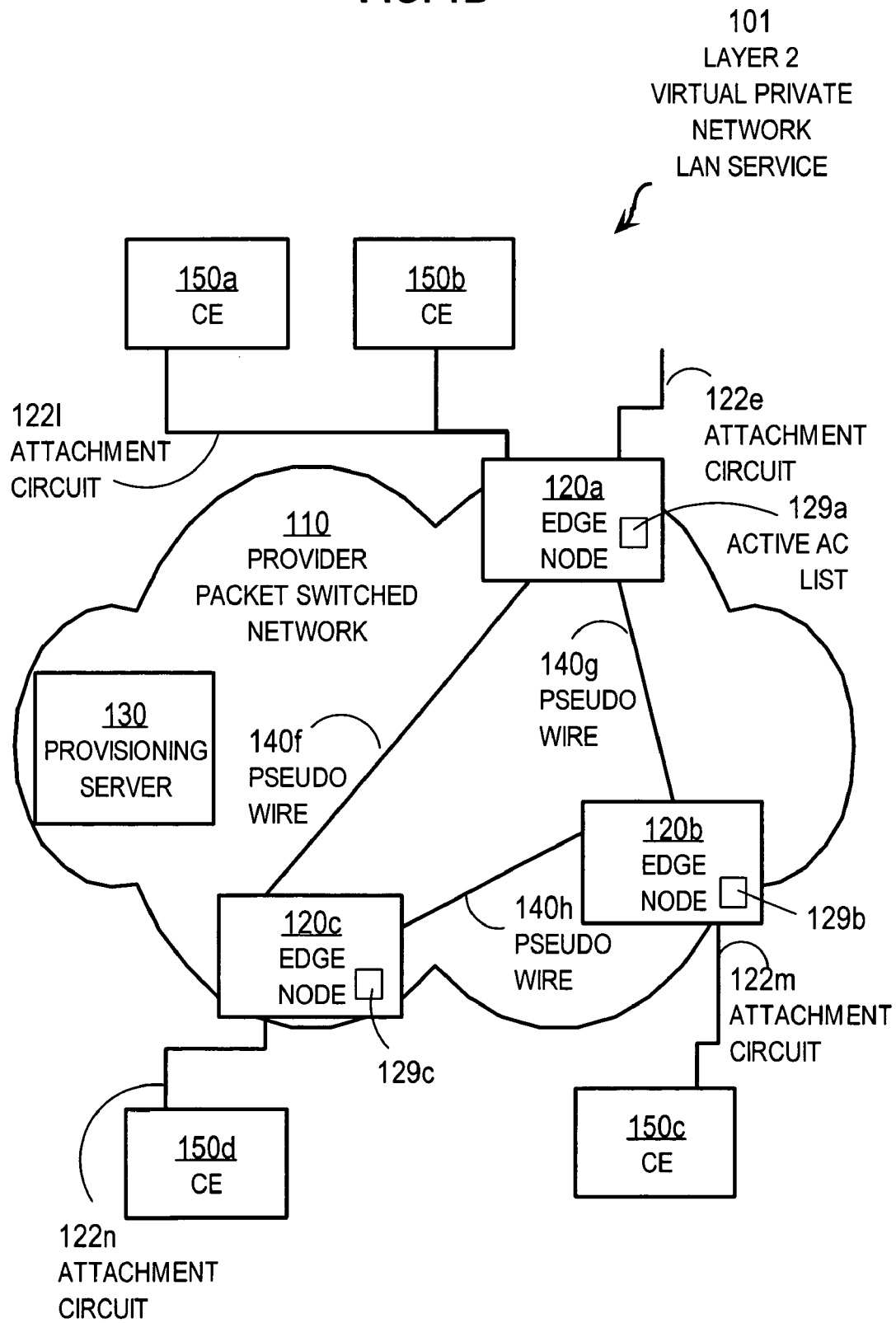
FIG. 1B is a block diagram that illustrates a virtual private network on a provider packet-switched network for a virtual private LAN service, according to an embodiment.

In some VPN service, called a virtual private local-area network (LAN) service (VPLS) every CE is connected to every other CE on the VPN and data traffic flows to them all as if on an Ethernet LAN. FIG. 1B is a block diagram that illustrates a virtual private network 101 on a provider packet-switched network 110 for VPLS, according to an embodiment. For example, VPN 101 includes sufficient PWs 140f, 140g, 140h to connect each PE 120a, 120b, 120c to the others. Traffic between different CEs on the VLAN is not distinguished by separate ACs and separate PWs. Thus, CEs 150a, 150b are on the same LAN, which forms AC 122l, and traffic from both is carried to CE 150c via a single PW 140g to PE 120b and thence via a single AC 122m. Similarly traffic from both is carried to CE 150d via a single PW 140f to PE 120c and thence via a single AC 122n. Inactive AC 122e is kept separate for use in a different VPLS or VPWS VPN. Clearly, the provisioning of PSN 110 is different for the different VPNs 100 and 101, even though both involve the same PEs and CEs.

According to some embodiments of the invention, described in more detail below, each PE 120 includes a list of active ACs. As shown in FIG. 1A and FIG. 1B, PE 120a includes active AC list 129a, PE 120ba includes active AC list 129b, and PE 120c includes active AC list 129c. Hereinafter, active AC lists 129a, 129b, 129c are collectively referenced as active AC list 129.

2.0 Methods at Provider Edge Node for Using Sod

According to various embodiments of the invention, one or more provider edge nodes on the provider network detect and respond to a sign of death (SOD) on an attachment circuit (AC) without human intervention. A SOD is any indication that communications on a physical or virtual attachment circuit are terminated.

In various embodiments, a SOD on an AC is used to aid in fault detection, billing and accounting, and forming logs of usage, among other uses. In the illustrated embodiments, the SOD on an AC is used to free network resources devoted to the dead AC. In many of these embodiments, the automatic SOD detection is paired with an automatic first sign of life (FSOL) detection to automatically provision and release network resources for layer 2 VPNs. The automatic provisioning and release allows provider equipment in some embodiment to be over-subscribed; i.e., to support more VPNs (and accompanying ACs) over a usage cycle than can be supported simultaneously.

The configuration data for the over-subscribed attachment circuits may be stored either locally on each edge node or remotely, such as at a central cluster of one or more servers from which the configuration data is sent as needed. In the illustrated embodiments, the edge node requests the configuration data from the central cluster upon detecting the FSOL for an attachment circuit.

For example, according to some embodiments, provisioning server 130 stores configuration data for more attachment circuits than can be supported simultaneously at an edge node. For example, provisioning server stores configuration data for five ACs 122a through 122e even though the resources at edge node 120a can only support three of them at a time. This might be the case for any number of commercially viable reasons. It is assumed for purposes of illustration that, in VPN 100, CE 150a and 150b are located in New York City, while CE 150c is in London and CE 150d is in Tokyo. In this circumstance AC 122a switched to PW 140a to Tokyo is not likely used at the same time as AC 122b switched to PW 140c to London. Thus edge node 120a can support AC 122a and 122c during hours when NYC traffic is primarily with Tokyo (e.g., about 3 PM to 3 AM Eastern US Time) and can remove those ACs and support ACs 122b and 122d during hours when NYC traffic is primarily with London (e.g., about 3 AM to 3 PM Eastern US Time).

When a new CE (not shown) or service is connected to unused AC 122e, the provider edge node (e.g., 120a) detects a FSOL and sends a request to provisioning server 130 to obtain configuration data. Provisioning server 130 sends the configuration data to PE 120a and causes new PWs (not shown) to be formed with PE 120b or PE 120c or both. Similarly, provisioning server 130 sends configuration data to PEs 120b, 120c that cause those PEs to switch the new PWs with new ACs (not shown) on PEs 120b, 120c, when those new ACs show FSOL. Thus provisioning server 130 provisions VPN 100 without human intervention based on FSOL on attachment circuits. If AC 122e joins VPN 101, instead of joining VPN 100, then provisioning server 130 causes PE 120a to merge AC 122e with LAN AC 122l and sends traffic from AC 122e over both extant PWs 140f, 140g. The use of the FSOL is described in more detail in Booth, cited above.

Similarly, when an AC revives, e.g., when AC 122a becomes active at about 5 PM Eastern US time for communications with Tokyo, the provider edge node 120a detects a FSOL and sends a request to provisioning server 130 to obtain configuration data. Provisioning server 130 sends the configuration data to PE 120a and causes PW 140a to be re-formed with PE 120c and attachment circuit 122k to CE 150d in Tokyo.

2.1 Method for Using a Sign of Death (SOD)

FIG. 2A is a flow diagram that illustrates at a high level a method 200 for using a sign of death (SOD) on a customer attachment circuit at an edge node of a provider network, according to an embodiment. Although steps are shown in FIG. 2A and subsequent flow diagrams in a particular order for purposes of illustration, in other embodiments one or more steps may be performed in a different order or overlapping in time or omitted, or changed in some combination of ways.

In step 210, the provider edge node (e.g., PE 120a) determines physical ports and media types that are directed to customer equipment. Any method may be used to determine this list.

It is assumed for purposes of illustration that PE 120a has 24 physical ports for linking to customer equipment, 16 physical ports are Fast Ethernet (e.g., 4 ports of 100Base-T2 and 12 ports of 100Base-T4), 4 physical ports are ATM ports, and 4 physical ports are Frame Relay ports. It is further assumed that PE 120a has two other physical ports connected to other nodes in the provider network 110 (e.g., 2 physical ports that are Gigabyte Ethernet). In step 210, for example when PE 120a powers up, PE 120a builds a data structure that indicates identifiers for itself, its connections to other nodes in the provider network, and its interfaces to customer equipment. Example information for such a data structure is listed in Table 1.

TABLE 1

Example physical ports and media types for PE 120a.

| Physical port IDs | media type | Facing |
|---|---|---|
| 0 | null | self |
| 1 to 2 | Gigabyte Ethernet | provider network |
| 3 to 6 | Fast Ethernet (100Base-T2) | customer |
| 7 to 18 | Fast Ethernet (100Base-T4) | customer |
| 19 to 22 | ATM | customer |
| 23-26 | Frame Relay | customer |

Any method may be used to receive this data. In some embodiments, the information is input manually by a network administrator and stored locally or on a remote node. In some embodiments, some of the information is stored locally on the device by the original equipment manufacturer (OEM). In some embodiments, the data is retrieved from storage locally (e.g., from a read only memory, ROM) or remotely. In some embodiments, the data is sent in a message from another node on the network either in response to a message from the node requesting the data or in an unsolicited message. In some embodiments a combination of different methods is used.

In step 213, data is received for provisioning the edge node network interfaces. In the illustrated embodiment, the data indicates a provisioning server, e.g., server 130, which provides configuration data on request, as described in Booth. In other embodiments, the data received in step 213 is some or all of the configuration data for one or more interfaces to switch one or more attachment circuits to one or more pseudo wires to form one or more VPNs. In the illustrated embodiment, the provisioning server holds configuration data for an over-subscribed network node with at least one over-subscribed interface. In other embodiments, the network 110 is over-subscribed rather than the individual edge node or interface. In some embodiment, none of the network equipment is over-subscribed by the provisioning data. Any method may be used to receive this information, as described above for step 210. In some embodiments, the configuration data for provisioning a VPN is pushed to one or more provider edge nodes during step 213. In some embodiments, the configuration data is pushed as needed (in step 260, described below) and step 213 is omitted.

In step 214, each customer-facing physical port is associated with a list of active attachment circuits, such as active AC list 129. A list structure is preferred, because some physical ports may be used for multiple virtual circuits; but in other embodiments, other data structures may be used. Initially, for example when PE 120a powers up, the list 129a is likely to be empty with no active attachment circuits. Any method may be used to associate each customer-facing port with a list of active attachment ports. For example, a data structure is formed on PE 120a as list 129a. List 129a has a physical port ID and a link list with no entries, as shown in Table 2, below, for some customer-facing ports. In some embodiments, a single list of active attachment circuits is maintained for a provider edge node, and the physical port associated with each entry is indicated by the name for the attachment circuit. There may be local configuration data for this, essentially containing an identifier (ID) for each physical or logical interface configured, based on configuration data received. In some embodiments, there is automatic generation of an ID based on some algorithm, basically allowing any packet to arrive, deducing the logical port from the arriving packet, and generating an ID automatically. The provisioning server (or the person who provides data for the provisioning server), uses the same algorithm for determining the attachment circuit ID. In various embodiments, the ID is based on the platform, line-cards, or other hardware information, or requested and returned in messages, such as messages formatted according to the simple network management protocol (SNMP).

TABLE 2

Example initial associations between ports and active attachment circuits.

| Physical port ID | List of active attachment circuits |
|---|---|
| 3 | Null |
| 4 | Null |
| 5 | Null |
| ... | Null |

In step 270, it is determined whether there is a sign of death (SOD) for a logical or physical attachment circuit. Step 270 is described in more detail below with reference to FIG. 2B. If a SOD is determined for an attachment circuit, control passes to steps 271, 272 described below. If a SOD is not determined on an attachment circuit, control passes to step 220. Steps 220 and following are described next to indicate how active attachment circuits are associated with physical interfaces (i.e., physical ports).

In step 220, a signal is received on a physical port facing customer equipment. For purposes of illustration it is assumed that a signal is received on physical port #4 that comprises multiple changes in a physical phenomenon, such as an electric voltage or an optical wavelength.

In step 240, it is determined whether the signal is a first sign of life (FSOL) for an attachment circuit for that port, as described in Booth. In general, any Operations and Management (OAM) signaling used for setup, maintenance, troubleshooting, or tear-down of a circuit may be used to detect a first sign of life (FSOL).

If the signal is not FSOL for an attachment circuit, control passes to step 250. In step 250, it is determined whether the signal is a control plane signal to tear down a virtual circuit. If so, control passes to step 252 in which the virtual circuit is removed from the list of active attachment circuits. In some embodiments, a positive signal that indicates a virtual circuit is to be torn down is considered a sign of death, but is handled in step 250 not in step 270. In some embodiments a positive signal that indicates a virtual circuit is to be torn down is considered a sign of death and is handled in step 270; so steps 250 and 252 are omitted.

Control then passes to step 290 to process the signal normally. For example, after one or more attachment circuits have been active on the edge node, a data packet associated with one of those attachment circuits is processed in step 290. In step 290, a signal is processed according to any manner known in the art at the time the method 200 is implemented. For example, a data packet of multiple bits is examined and found to be in error or is forwarded according to a routing table. Control then passes back to step 270 to again determine whether there is a sign of death on an attachment circuit.

If it is determined in step 240 that the received signal is a FSOL, control passes to step 260 to obtain configuration data for an attachment circuit associated with the signal. For example, as described in more detail in Booth, a signal received on a customer-facing physical port with a null list of active attachment circuits is determined to be a FSOL; and control passes to step 260. In some embodiments, the signal includes data used to identify an attachment circuit. In some embodiments, the physical port ID is used to identify an attachment circuit. In some embodiments the configuration data includes data that indicates a VPN associated with the attachment circuit. In some embodiments the configuration data involves more resources than can be supported simultaneously and the interface (or other provider network resource) is over-subscribed.

Any method may be used to obtain the configuration data, as described above for receiving data indicating the physical ports and the provisioning server, in steps 210 and 213, respectively. More details on step 260 are described in Booth.

In step 280, the provider edge node responds to the FSOL signal based on the configuration data. In some embodiments, step 280 includes configuring the attachment circuit on the provider edge node, for example to be switched to a particular VPN. In some embodiments, step 280 includes sending a message to a customer if the signal received on the physical port is not consistent with any service subscribed to by the customer, as defined by the configuration data. In some embodiments in which the attachment circuit is already configured, step 280 determines that no special action is called for and simply passes the signal on to step 290 for normal processing. In an illustrated embodiment, when consistent configuration data is found for the signal, an identifier for the attachment circuit is added to the list of attachment circuits associated with the physical port. Step 280 is described in more detail in Booth.

To better illustrate the use of SOD by edge node, it is assumed that several attachment circuits are formed on the edge node interfaces as a result of FSOL signals received and processed in steps 220 through 280. Table 3 shows, for purposes of illustration, the assumed contents of an example active AC list on edge node 120*a* after repeated operation of steps 220 through 280. The AC identifiers (AC IDs) used in Table 3 are described in more detail in the following section. Note that the attachment circuits on Ethernet physical port 4 are virtual local area networks (VLANs) with numerical tags; that the attachment circuit on ATM port 20 is a virtual circuit identified by a virtual path identifier (VPI) that indicates a group of virtual circuits, and a two-octet virtual channel identifier (VCI); and that the attachment circuit on FR port 25 is a virtual circuit identified by a data-link connection identifier (DLCI).

TABLE 3

Example associations between ports and active attachment circuits.

| Physical port ID | List of active attachment circuits |
|---|---|
| 3 | null |
| 4 | VLAN 17 |
| 5 | null |
| ... | null |
| 20 | ATM VPI = 128/VCI = 55 |
| ... | null |
| 25 | FR DLCI 11 |
| ... | null |

The SOD is expected to be different on different physical interfaces and for different protocols. More details on determining the SOD in step 270 are described in a later section.

If it is determined in step 270, that a sign of death (SOD) is indicated on an attachment circuit, control passes to step 271. For purposes of illustration, it is assumed that a SOD is indicated on FR interface 25. Control passes to step 271.

In step 271, notification is sent over the provider network 110 to some server. For example, in some embodiments, a SOD is an indication of a fault in the system, such as a short or breakage in cabling between provider edge node (e.g., 120*a*) and customer equipment (e.g., 150*a*). In some such embodiments, the SOD is reported to a network service administrator to determine remedial action. In some embodiments, a SOD is a sign of end of a service for which the customer is being billed. In some such embodiments, the SOD is reported to a billing or accounting server. In some embodiments, a SOD is a sign of an end to usage of network resources and the usage cessation is logged. In some such embodiments, the SOD is reported to a usage logging server.

In some embodiments, step 271 is omitted. For example, in some embodiments that over-subscribe attachment circuits on edge node interfaces facing customer equipment, a dead attachment circuit is an opportunity to revive another attachment circuit and not a cause for notification, and step 271 is omitted. For example, a dead attachment circuit for a pseudo wire to Tokyo is an opportunity to revive a pseudo wire to London on the FSOL of that attachment circuit, and step 271 is omitted. For purposes of illustration, it is assumed that FR DLCI 11 is AC 122*a* that switches to PW 140*a* to edge node 120*c* in Tokyo, and therefore its SOD is an opportunity to revive AC 122*b* for London traffic. In some such embodiments, no notification is sent and step 271 is omitted.

In step 272, resources associated with the attachment circuit are freed, and the attachment circuit is removed from the list of active attachment circuits. For example, bandwidth on the interface with the customer equipment is freed for use with another attachment circuit. Table 4 shows, for purposes of illustration, the assumed contents of an example active AC list on edge node 120*a* after operation of step 272, after a SOD is detected for FR DCLI 11 on physical port 25.

TABLE 4

Example associations between ports and active attachment circuits after SOD.

| Physical port ID | List of active attachment circuits |
|---|---|
| 3 | null |
| 4 | VLAN 17 |
| 5 | null |
| ... | null |
| 20 | ATM VPI = 128/VCI = 55 |
| ... | Null |
| 25 | null |
| ... | Null |

In some embodiments, a pseudo-wire associated with a dead attachment circuit is either actively torn down, or passively not kept alive, during step 272. Thus pseudo-wire signaling is also a freed network resource. In the illustrated example, a SOD on AC 122*a* causes the provider network 110 to refrain from keeping alive PW 140*a*. The reduction of pseudo-wire signaling is an important advantage for equipment which terminates a large number of pseudo-wires into virtual interfaces (e.g., layer 2 to layer 3 "L2-L3" equipment or L2TP Network Server "LNS" equipment). These embodiments allow equipment which can service large numbers of pseudo-wires (potentially hundreds of thousands) with very few interfaces, and within a small footprint. In such embodiments, a great deal of the scaling limitation is not interface density, but the ability to service the signaling and virtual interfaces associated with the resulting large number of pseudo-wires. Reducing the existence of such signaling for pseudo-wires of "dead" attachment circuits provides a considerable scaling benefit.

Using method 200, a provider edge node (e.g., 120*a*) can respond dynamically, without human intervention, to signals received from customer equipment on any physical port (e.g., 122*e*) to automatically configure one or more attachment circuits, such as to join one or more VPNs, to automatically delete the attachment circuit upon a SOD and free the network resources used by that attachment circuit, including freeing the resources consumed by one or more pseudo-wires in some embodiments. Thus method 200 allows provider network resources to be over-subscribed.

Although the method is illustrated for a very few attachment circuits, it is often difficult to predict the performance of so few attachment circuits and therefore it is often imprudent to over-subscribe a network interface with so few attachment circuits. However, as the number of attachment circuits grows, the percentage of under-utilized resources becomes more predictable, and it becomes more prudent to over-subscribe the edge node resources. Such large number over-subscription allows, for example, allocation of more than 4096 VLANs on a given Ethernet interface (even though 4096 is the maximum number VLANs allowed in a single 802.1Q tag). To utilize such a capability, the VLAN IDs are dynamically allocated to attachment circuits in some embodiments. Similarly, in some embodiments, limited segmentation and reassembly (SAR) capabilities are dynamically managed over an ATM interface. SAR is a limited resource on an interface. Assigning those resources interfaces only for "alive" circuits minimizes an "out of resource" condition. Similarly, VLANs are limited resources on Ethernet switches (typically at the box level). At the most generic level, any limited resource that is necessary on a per-circuit basis can be better managed if a management function can determine whether that circuit is being used or not. Thus the SOD coupled with the FSOL is used to determine which circuits are being used.

2.2 Method for Obtaining Configuration Data

As described above, configuration data is obtained in step 260. Any method may be used to obtain the configuration data. In some embodiments, configuration data for attachment circuits already reside on the provider edge node (e.g., 120*a*). In the illustrated embodiments, the configuration data is obtained by sending a request for configuration data to a provisioning server (e.g., provisioning server 130) on the provider network.

Often, the configuration data is derived based on customer specifications for the topology for the VPN and level of service—information that is received when the customer subscribes to the service. For example, configuration data is received and stored at provisioning server 130 that indicates for VPN 100 the service is VPWS; the attachment circuits 122 are frame relay virtual circuits, each identified by a data link connection identifier (DLCI); the participating edge nodes are PEs 120*a*, 120*b*, 120*c*; and PWs 140*a*, 140*b*, 140*c*, 140*d*, 140*e* have a certain level of service, e.g., a certain value for a per-hop behavior (PHB) parameter. The use of PHB to indicate level of service is described in RFC 3140 entitled "Per Hop Behavior Identification Codes," by D. Black, S. Brim, B. Carpenter, F. Le Faucheur (June 2001), the entire contents of which are hereby incorporated by reference as if fully set forth herein.

In an alternative example, configuration data is received and stored at provisioning server 130 that indicates for VPN 100 the service is VPWS; the attachment circuits 122*b*, 122*c*, 122*h*, 122*j* are ATM virtual circuits; the participating edge nodes 120 are PEs 120*a*, 120*b*, 120*c*; with connecting pseudo wires PW 140*b* and PW 140*c* that are built on MPLS and have a level of service indicated by a value of an MPLS experimental (EXP) parameter. The use of EXP to indicate level of service is described in RFC 3032 entitled "MPLS Label Stack Encoding" by E. Rosen, D. Tappan, G. Fedorkow, Y. Rekhter, D. Farinacci, T. Li, A. Conta, (January 2001), the entire contents of which are hereby incorporated by reference as if fully set forth herein. RFC 3032 and RFC 3140 are implementations of Differentiated Services Code Point (DSCP) described in RFC 2474 entitled "Definition of the Differentiated Services Field (DS Field) in the IPv4 and IPv6 Headers," by K. Nichols, S. Blake, F. Baker, D. Black (December 1998), the entire contents of which are hereby incorporated by reference as if fully set forth herein.

For example, configuration data is received and stored at provisioning server 130 that indicates for VPN 101 the service is VPLS; the attachment circuits 122 are Ethernet virtual local area networks (VLANs), each identified by a VLAN tag in the Ethernet header; the participating edge nodes are PEs 120*a*, 120*b*, 120*c*; and PWs 140*f*, 140*g*, 140*h* have a certain level of service, e.g., a certain value for a per-hop behavior (PHB) parameter.

Example data structures for storing configuration data locally on the provider edge node or on a provisioning server, such as a Remote Authentication Dial-In User Service (RADIUS) server are illustrated in FIGS. 3A, 3B, and 3C. Some or all of these data structures may be used in other embodiments of provisioning server 130 that do not use the RADIUS protocol. FIG. 3A is a block diagram that illustrates a customer interface record 300, according to an embodiment. In the illustrated embodiment, the record 300 includes four fields, a router identification (Router ID) field 302, an attachment circuit identification (AC ID) field 304, a network virtual circuit (VC) identification (VC ID) field 306, and an attachment circuit (AC) service field 308.

The Router ID field 302 holds data that uniquely indicates a provider edge node that is to receive the configuration data. In the illustrated embodiment, this provider edge node sends a RADIUS authorization request to the provisioning server. The value of the Router ID field 302 serves as an index to a particular record in the data stored on the RADIUS server. In an illustrated embodiment, the value of the Router ID field is the IP address of the provider edge node on the provider network. An IP address is four octets that are commonly designated by four decimal values separate by three dots, where each decimal value falls between 0 and 255, inclusive. An advantage of this embodiment is that the IP address of the requesting edge node is included in the header of an IP data packet carrying the request and is automatically used by the provisioning server to find the appropriate record to use in a response. For purposes of illustration, it is assumed that PEs 120*a*, 120*b*, 120*c* have IP addresses 1.1.1.1, 1.1.1.2 and 1.1.1.3, respectively. For some embodiments with locally stored configuration data, the router ID field 302 is omitted.

In some embodiments, the Router ID field 302 holds the IP address of the provider edge node (e.g., PE 120*a*) to be configured. In some embodiments, the Router ID field holds other data, such as text, that uniquely identifies the provider edge node (e.g., PE 120*a*) in the provider network.

The AC ID field 304 holds data that indicates a physical or logical attachment circuit on a provider edge node that is a member of a VPN. The value of the AC ID field 304 serves as a secondary index to a particular record in the configuration data stored on the provisioning server (e.g., server 130). The AC ID field serves as the primary index to a particular record in the configuration data stored locally. Any method may be used to indicate the attachment circuit. In one embodiment, the AC ID field 304 holds data that uniquely indicates physical links on the router identified in Router ID field 302, such as some combination of the physical port ID and a virtual circuit ID. For example, a certain class of routers internally number the physical interfaces on each router from 0 through N, where N is the number of physical interfaces, and 0 refers to the router itself. In some embodiments the physical interfaces are named in software. In some embodiments, the AC is uniquely indicated by an arbitrary value (e.g., a name or number).

In some embodiments, the AC ID is based on a logical attachment circuit, such as a frame relay or ATM virtual circuit name, used on the CE. For example, ATM virtual circuits are identified by an ATM port name, a one-octet virtual path identifier (VPI) that indicates a group of virtual circuits, and a two-octet virtual channel identifier (VCI) in the header of an ATM cell. The VPI/VCI combination is used to identify the next destination of an ATM cell as it passes through a series of ATM switches. In embodiments using the ATM virtual circuit identifier as an arbitrary name for an attachment circuit, the AC ID comprises the ATM port, VPI and VCI. For example, if the ATM port is named "atm1/0" and the VPI is "2" and the VCI is "34," then an appropriate AC ID is "atm1/0.2.34." In the example of Table 1, an ATM port has port ID 20 and an appropriate AC ID is "20.2.34." Since the customer subscribes to the VPN, the customer names for the virtual circuits are appropriate to use as an index into the configuration data stored on the provisioning server.

In some embodiments, the AC ID field 304 holds CE ID data that uniquely identifies a piece of customer premises equipment connected to provider edge equipment. For example, a network access identifier (NAI) or a Domain Name Server (DNS) host name associated with the CE can serve as CE ID data. The use of NAI to indicate a CE is described in RFC 2486 entitled "The Network Access Identifier," by B. Aboba, M. Beadles (January 1999), the entire contents of which are hereby incorporated by reference as if fully set forth herein. The use of DNS to indicate a CE is described in RFC 1101 entitled "DNS encoding of network names and other types," by P. V. Mockapetris (April 1989), the entire contents of which are hereby incorporated by reference as if fully set forth herein. It is assumed for purposes of illustration that CE 150*d* has an NAI of "providerX/atlanta@vpnY.domainZ.net." For VPLS or for a CE with a single attachment circuit to a provider edge node, an AC ID value that is only a CE ID value is sufficient to determine VPN membership. For VPWS and a CE with multiple logical or physical attachment circuits to a provider edge, an AC ID includes both a CE ID along with a customer name for an attachment circuit to determine a unique identifier for an attachment circuit, and thence VPN membership.

In various embodiments, the AC ID field 304 holds either an AC specific identifier or a CE identifier, or both.

The VC ID field 306 holds data that uniquely indicates a particular collection of pseudo wires on the provider network, e.g., network 110. In a VPLS, the VC ID indicates all the pseudo wires in the VPN, e.g., PWs 140*f*, 140*g*, 140*h* in VPN 101. In a VPWS, the VC ID indicates a single pseudo wire that provides point-to-point traffic as part of a particular VPN. In some embodiments, the VC ID field 306 holds data that indicates a VPN-ID as described in RFC2685, the entire contents of which are hereby incorporated by references as if fully set forth herein. In some embodiments the VC ID field 306 holds data that indicates a VPN differently from the VPN-ID as described in RFC2685.

In some embodiments, the VC ID serves as an attachment group identifier (AGI) so that each attachment circuit on a VPN can be uniquely identified within the group identifier using an attachment individual identifier (AII).

The AC Service field 308 holds data that describes the service to be provided to an AC or CE. In some embodiments, the field 308 includes data that indicates the type of VPN service, e.g., whether the VPN service type is VPLS, VPWS, or IP-only LAN-like Service (IPLS) or some other type of service. In some embodiments, the field 308 includes data that indicates attachment circuit specific parameters. Attachment circuit-specific parameter include, but are not limited to: a quality of service level associated with minimum values for bandwidth, and maximum values for latency and jitter; specific values for bandwidth, latency and jitter; an attachment circuit data plane protocol and control plane protocol; authentication credentials; attachment circuit original equipment manufacturer (OEM) addresses, Operations and Management (OAM) signaling; and values for configurable parameters associated with those protocols, such as cell packing for ATM, and maximum transmission unit (MTU) for packet sizes. For purposes of illustration, it is assumed that AC Service field 308 holds data that indicates a service type of VPLS with Ethernet VLAN protocol for both data and control planes on the attachment circuits, and each attachment circuit allowed up to 30% of bandwidth on a physical port.

FIG. 3B is a block diagram that illustrates a VPN record 320 on a provisioning server, according to an embodiment. In the illustrated embodiment, the record 320 includes three fields, a Router ID field 302, VC ID field 306, and an Other PE list field 324.

The Router ID field 302 and VC ID field 306 are as described above for the attachment circuit record 300. The value of the Router ID field 302 serves as a primary index, and the value of the VC ID field serves as a secondary index, to a particular VPN record 320 in the data stored on the provisioning server. The Router ID field 302 is omitted and the VC ID field serves as the primary index to the record 320 in some embodiments in which the configuration data is stored locally.

The Other PE list field 324 holds data that indicates one or more provider edge nodes to which the edge node identified in Router ID field 302 forms pseudo wires to support the VC indicated in the VC ID field 306. For VPWS, the Other PE list 324 includes an identifier for a single PE different than the PE indicated by the Router ID field 302. In the example VPWS, VPN 100, the Other PE list field 324 for the record with Router ID value 1.1.1.1 (PE 120a) and VC ID corresponding to PW 140a holds data that indicates PE 120c, such as its IP address 1.1.1.3. In the same example, the Other PE list field 324 for the record with Router ID value 1.1.1.3 (PE 120c) holds data that indicates PE 120a. For VPLS, the Other PE list 324 includes identifiers for all PEs on the VPN different than the PE indicated by the Router ID field 302. In the example VPLS, VPN 101, the Other PE list field 324 for the record with Router ID value 1.1.1.1 (PE 120a) and VC ID corresponding to VPN 101 with PWs 140f, 140g, 140h, holds data that indicates PE 120b and PE 120c, such as their IP addresses.

FIG. 3C is a block diagram that illustrates a pseudo wire record 340 on a provisioning server, according to an embodiment. In the illustrated embodiment, the record 340 includes three fields, a Router ID field 302, an Other PE ID field 344, and a pseudo wire (PW) properties field 348.

The Router ID field 302 is as described above for both the attachment circuit record 300 and VPN record 320. The Router ID field 302 serves as a primary index to a particular PW record 340 in the data stored on the provisioning server. The Router ID field 302 is omitted in some embodiments in which the configuration data is stored locally.

The Other PE ID field 344 holds data that indicates a target provider edge node for a particular pseudo wire. The Other PE ID field 344 serves as a secondary index to a particular PW record 340 in the data stored on the provisioning server. The Other PE field 344 serves as the primary index to the record 320 in some embodiments in which the configuration data is stored locally. In some embodiments, the field 344 includes just an identifier for the router. In some embodiments the field 344 includes also an identifier for a particular attachment circuit on the target router.

The PW properties field 348 holds data that indicate one or more properties of the PW that are used to configure a provider edge node to form the PW. For example, in some embodiments, the PW properties field includes data that indicates a control plane protocol (e.g., the Label Distribution Protocol, LDP) for negotiating the PW with the target provider edge node. In some embodiments, the PW properties field includes data that indicates a value of an EXP parameter (e.g., a hexadecimal value "3" designated "0x03") as described in RFC3032, cited above. In some embodiments, the PW properties field 348 includes one or more pairs of attributes and values for PW properties.

An advantage of the data structures described above with reference to FIG. 3A, FIG. 3B and FIG. 3C, is that they allow the hierarchical relationships between attachment circuits, VPN edge node members and pseudo wires to be represented as flat files used by some provisioning servers, such as RADIUS servers. The configuration data stored in these data structures may be sent to a provider edge node in one or multiple different response messages. Another advantage of these data structures are that they are small and thus can be used to send incremental changes in configuration data to provider edge nodes.

In another embodiment, data for two or more of these data structures are combined into the same data structure on the provisioning server. An advantage of combining these data structures is that fewer operations are required on the provisioning server to retrieve the configuration data. Thus the combined data can be returned in one transaction. A disadvantage of combining these data structures is that data not relevant to a particular edge node and attachment circuit is included in a record and retrieved. Thus, either the provisioning server or the receiving provider edge node consumes processing resources to filter out the unwanted information. If the receiving node does the filtering, then extra network resources are consumed to transmit the excess data.

Referring again to FIG. 2A, in step 260, configuration data is obtained for an attachment circuit. In some embodiments, the configuration data is stored in multiple data records 300, 320, 340 as described above with reference to FIG. 3A, FIG. 3B, FIG. 3C. In an illustrated embodiment, the configuration data is stored on a provisioning server, e.g., provisioning server 130; and step 260 includes sending a request message to the provisioning server for data in one or more of the data records 300, 320, 340, and receiving configuration data in one or more response messages.

2.3 Method for Detecting SOD

FIG. 2B is a flow diagram that illustrates step 270 of the method of FIG. 2A for detecting a sign of death (SOD) in more detail, according to an embodiment. Step 230 is a particular embodiment of step 270. After normal processing of received signals in step 290, for example, control passes to step 230. Step 230 includes steps 232, 234, 236, 238, 274. In some embodiments, one or more of these steps are omitted.

In step 232, it is determined whether there is any activity over an attachment circuit during a first threshold interval. The first threshold interval is selected to indicate an attachment circuit that is likely to be unused for an extended period on the order of several times the threshold interval. For example, an attachment circuit that is unused over 30 minutes is expected to remain unused for several hours. Thus, in an illustrated example it is assumed that the first threshold interval is 30 minutes. For example, it is determined during step 232, whether any FR traffic with DCLI "11" is passed through physical port 25 over the last 30 minutes. In various embodiments, packets are examined in a process called "sniffing" for looking for particular values in the header. FR would be DLCI, ATM would be VPI/VCI and/or frame type. Ethernet would be MAC address and/or VLAN(s). In embodiments in which an attachment circuit is a physical port, step 232 does not involve parsing the data to see if it is related to a particular virtual circuit, instead any sequence of physical changes is considered activity. For example, many physical attachment circuits typically express a voltage on a given line. In some embodiments, voltage detected on a line is used to signal "alive" or "dead," or other states.

If it is determined in step 232 that there is any activity on the attachment circuit, the attachment circuit appears to be active and control passes to step 234 to do further assessment. In some embodiments, steps 234 and following steps are omitted, the attachment circuit is determined not to be dead, and control passes directly to step 220.

If it is determined in step 232 that there is not any activity over the attachment circuit during the first threshold interval, then control passes to step 236. In step 236, the attachment circuit is tested by probing the customer equipment over the attachment circuit. For example, a ping message is sent over the attachment circuit to request a response message. Control then passes to step 238 to determine whether the response is received within a second threshold interval.

In step 238, it is determined whether a response to the request message, such as a ping, is received within a second threshold time interval. The second threshold interval is selected to indicate that the customer premises equipment is not responding. The second threshold interval is typically several times the travel time for a signal between the customer premises equipment and the provider edge node, such as one second. A failure to receive a response to a ping message typically indicates a configuration or hardware problem. If a response is not received within the second threshold interval, then the attachment circuit is dead, and control passes to step 271, as shown, to send notification, or step 272 to release network resources. If it is determined in step 238 that the response is received within the second threshold time interval, then it is determined that the attachment circuit is still alive and control passes to step 274.

In some embodiments, steps 236 and 238 are omitted, the attachment circuit is determined to be dead based on the inactivity determined in step 232, and control passes directly to step 271 to send notification, or step 272 to release network resources. For example, in embodiments that over-subscribe a network interface, there is no interest in keeping the attachment circuit alive just because there is no equipment or configuration disruption. The attachment circuit is considered dead if it is not expected to be used for several hours. Thus, in such embodiments, steps 236 and 238 are omitted.

If it is determined in step 232 that there is activity over the attachment circuit within the threshold interval, then control passes to step 234. In step 234 it is determined whether the activity is appropriate for the attachment circuit. For example, it is determined whether the data are consistent with the protocol (e.g., whether a FR header is seen in each FR attachment circuit, or whether a FR DLCI, Ethernet VLAN or ATM VPI/VCI is seen, as appropriate for the circuit type). In some embodiments, during step 234 it is determined whether a protocol specific "keep-alive" message has been received within the proper time frames.

If it is determined in step 234 that the activity is not appropriate for the attachment circuit, control passes to step 236 and 238 to probe the attachment circuit with a ping message. In embodiments that omit steps 236, 238, control passes directly to step 271, as shown, or step 272.

If it is determined in step 234 that the activity is appropriate for the attachment circuit, control passes to step 274. In step 274, it is determined whether an out-of-band event has occurred that indicates the attachment circuit is terminated. An out-of-band event is any event detected at the provider edge node that does not depend on signals received over the attachment circuit. For example, a message from the provisioning server that the configuration for the particular attachment circuit is withdrawn or invalid is an out-of-band event that indicates communications with the attachment circuit are terminated in some embodiments. In some embodiments, a message from a subscription server or authorization, authentication and accounting (AAA) server indicating the attachment circuit is no longer subscribed to, or is associated with a customer not in good standing, is the out-of-band event that indicates communications with the attachment circuit are terminated. In some embodiments, the customer simply indicates that the customer's network is to be re-provisioned for capacity planning (either temporary or permanent)

If it is determined that an out-of-band event has occurred that indicates the attachment circuit is terminated, control passes to step 271, as shown, or step 272, in various embodiments, to respond to a sign of death (SOD). If it is determined that an out-of-band event has not occurred that indicates the attachment circuit is terminated, control passes to step 220 to receive the next signals on the attachment circuit, thus leaving the attachment circuit in place.

In other embodiments, steps 232, 234, 236, 274 are performed in a different order from that shown in step 241, or one or more of these steps are omitted.

3.0 Implementation Mechanisms—Hardware Overview

Figure 4:
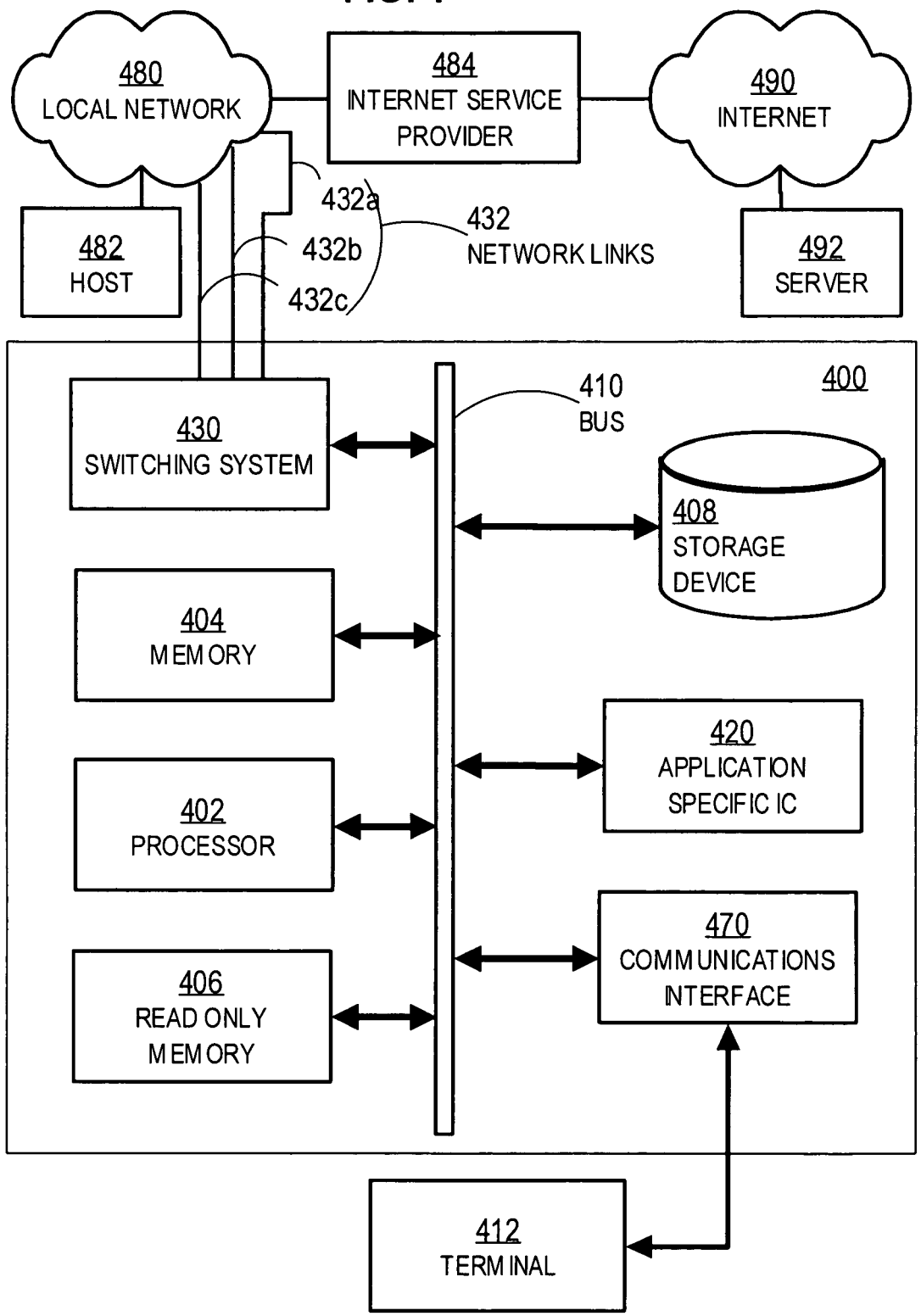
FIG. 4 is a block diagram that illustrates a computer system upon which an embodiment of the invention may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0,1 w) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

3.0 Extensions and Alternatives

In this specification and Appendix, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:

evaluating activity associated with a particular attachment circuit during a first threshold interval, wherein if no network traffic is detected over a port associated with the particular attachment circuit during the first threshold interval, then a ping message is sent and a second threshold interval is evaluated for a response to the ping message;

determining whether a sign of death (SOD) is indicated on the particular attachment circuit, wherein an out-of-band event is received that is indicative of the particular attachment circuit being terminated;

initiating a new network action at an intermediate network node in response to determining that the SOD is indicated on the particular attachment circuit; and receiving configuration data for configuring a plurality of additional attachment circuits at a network interface, and wherein the configuration data is received at a provisioning server that indicates participating provider edge nodes in a provider network and a respective level of service pertaining to per-hop behavior (PHB) parameters for a plurality of pseudowires that span between the participating provider edge nodes.

2. A method as recited in claim 1, said step of initiating the new network action further comprising removing the particular attachment circuit from association with a particular virtual private network so that network resources associated with switching the particular attachment circuit at the network interface with the particular virtual private network are released for switching a second attachment circuit with a second virtual private network.

3. A method as recited in claim 2 said step of initiating the new network action further comprising automatically configuring the network interface to switch the second attachment circuit with the second virtual private network.

4. A method as recited in claim 1 said step of determining whether the SOD is indicated on the particular attachment circuit further comprising determining whether the network interface receives a message that indicates a request to tear down the particular attachment circuit.

5. A method as recited in claim 1 said step of determining whether the SOD is indicated on the particular attachment circuit further comprising determining whether a threshold time is exceeded by an elapsed time since the network interface sent to a customer network node a message requesting a response message and no response message is received.

6. A method as recited in claim 1 said step of determining whether the SOD is indicated on the particular attachment circuit further comprising receiving a message from a subscription server that a customer subscription for the particular attachment circuit has ended.

7. An apparatus, comprising:
   one or more processors;
   a computer-readable medium; and
   one or more sequences of instructions stored in the computer-readable medium, which when executed by the one or more processors, causes the one or more processors to perform operations, comprising:
   evaluating activity associated with a particular attachment circuit during a first threshold interval, wherein if no network traffic is detected over a port associated with the particular attachment circuit during the first threshold interval, then a ping message is sent and a second threshold interval is evaluated for a response to the ping message;
   determining whether a sign of death (SOD) is indicated on a particular attachment circuit, wherein an out-of-band event is received that is indicative of the particular attachment circuit being terminated;
   initiating a new network action at an intermediate network node in response to determining that the SOD is indicated on the particular attachment circuit; and
   receiving configuration data for configuring a plurality of additional attachment circuits at a network interface, and wherein the configuration data is received at a provisioning server that indicates participating provider edge nodes in a provider network and a respective level of service pertaining to per-hop behavior (PHB) parameters for a plurality of pseudowires that span between the participating provider edge nodes.

8. An apparatus as recited in claim 7, said step of initiating the new network action further comprising automatically removing the particular attachment circuit from association with a particular virtual private network so that network resources associated with switching the particular attachment circuit are released for switching a second attachment circuit with a second virtual private network.

9. An apparatus as recited in claim 7 said step of determining whether the SOD is indicated on the particular attachment circuit further comprising determining whether the network interface receives a message that indicates a request to tear down the particular attachment circuit.

10. An apparatus as recited in claim 7 said step of determining whether the SOD is indicated on the particular attachment circuit further comprising determining whether a threshold time is exceeded by a elapsed time since the network interface sent to a customer network node a message requesting a response message and no response message is received.

11. An apparatus as recited in claim 7 said step of determining whether the SOD is indicated on the particular attachment circuit further comprising receiving a message from a subscription server that a customer subscription for the particular attachment circuit has ended.

* * * * *